Sept. 5, 1961  J. F. McCLELLAN  2,998,745
OPTICAL-THICKNESS AND REFRACTIVE-INDEX METER
Filed April 5, 1956  3 Sheets-Sheet 1
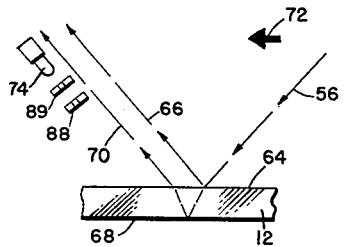
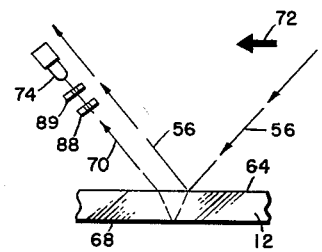
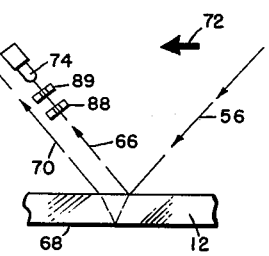
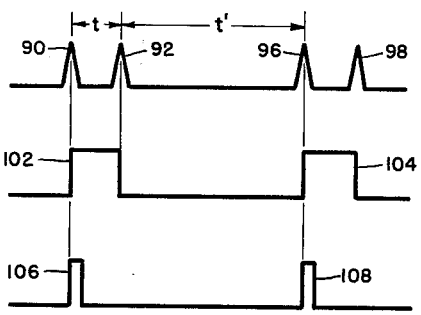
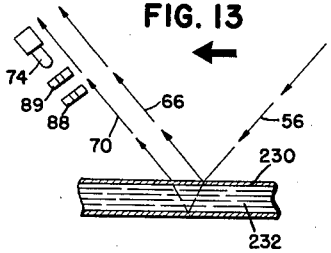
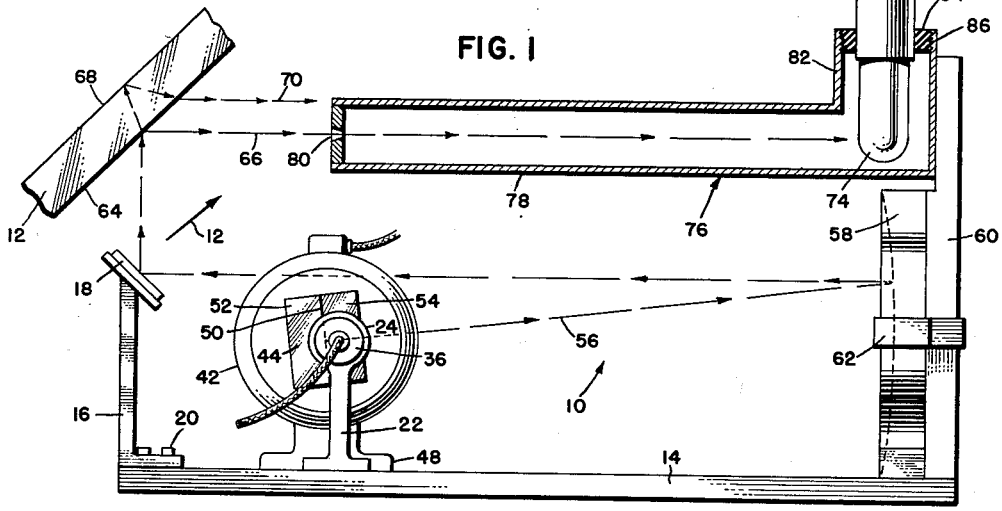
INVENTOR
JOHN F. McCLELLAN
BY Walter G. Finch
ATTORNEY Sept. 5, 1961  J. F. McCLELLAN  2,998,745
OPTICAL-THICKNESS AND REFRACTIVE-INDEX METER
Filed April 5, 1956  3 Sheets-Sheet 2
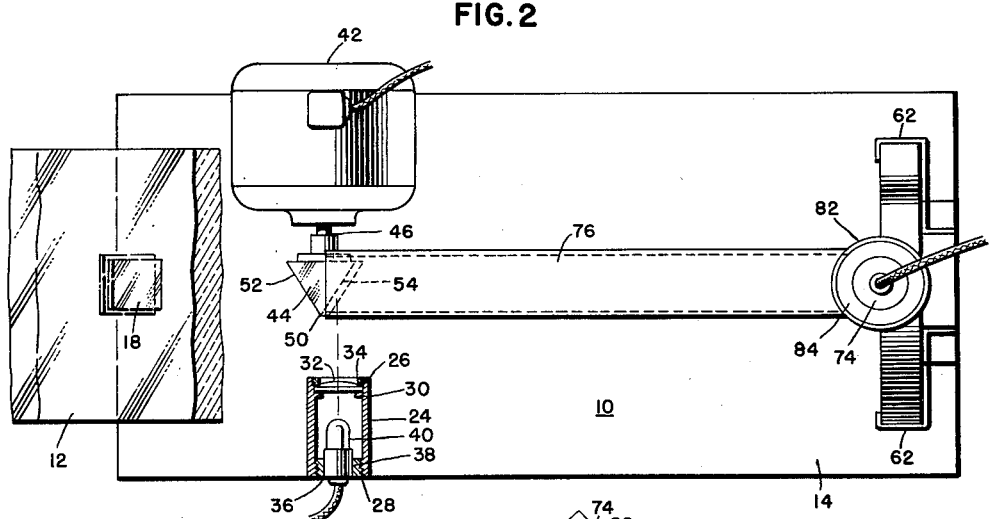
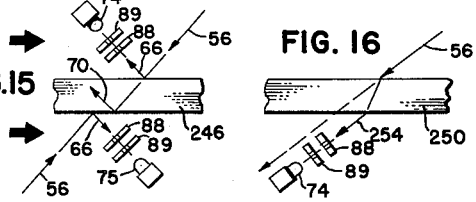
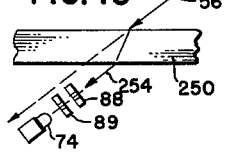
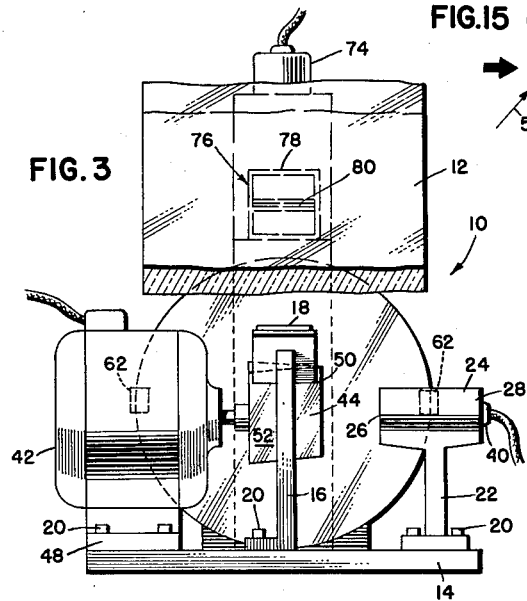
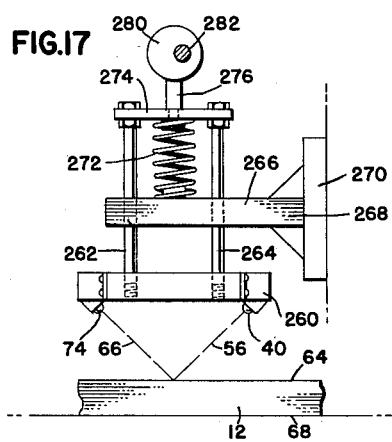
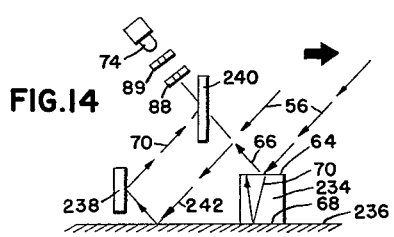
INVENTOR
JOHN F. McCLELLAN
BY Walter G. Finch
ATTORNEY Sept. 5, 1961 J. F. McCLELLAN 2,998,745
OPTICAL-THICKNESS AND REFRACTIVE-INDEX METER
Filed April 5, 1956 3 Sheets-Sheet 3
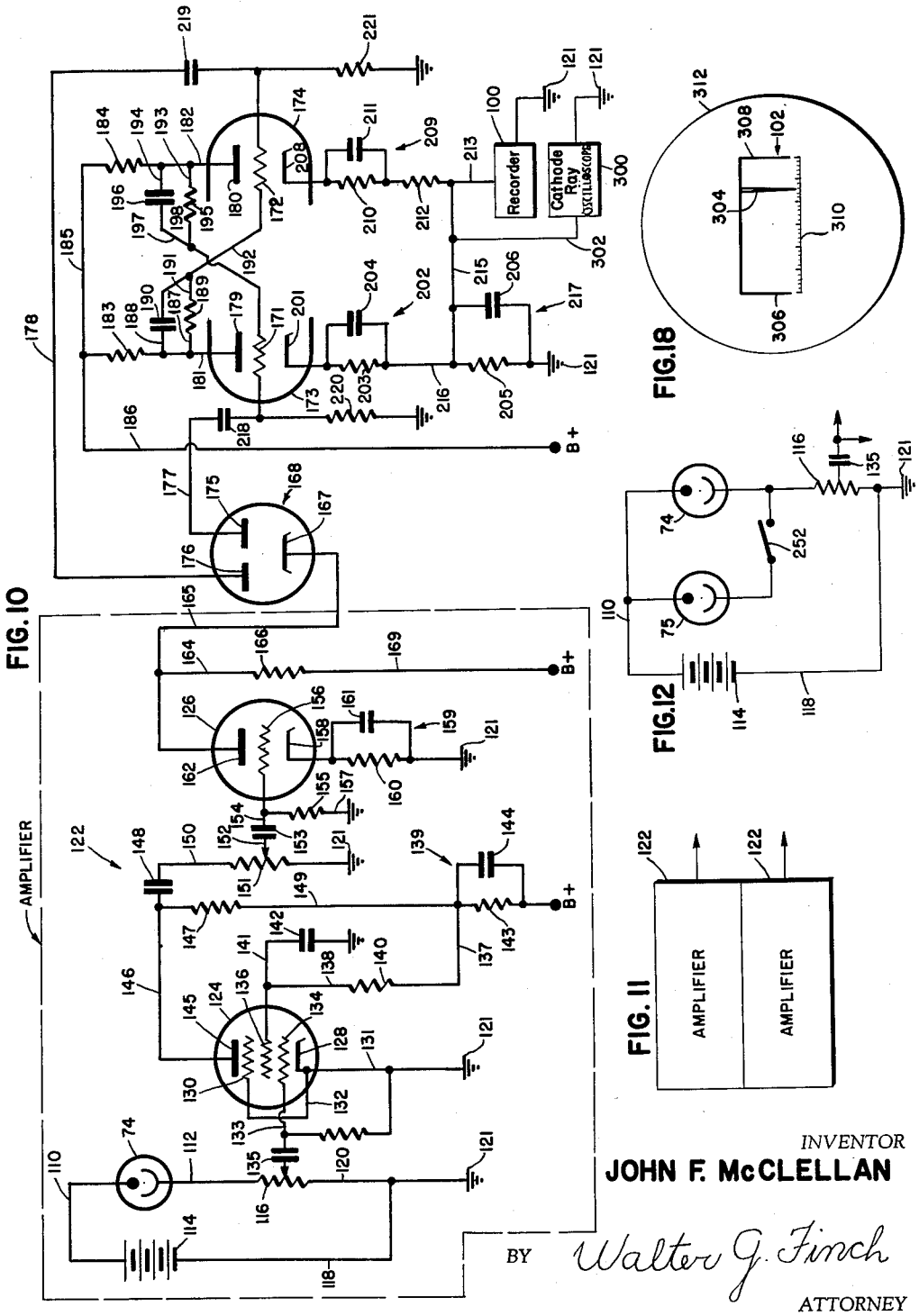
INVENTOR
JOHN F. McCLELLAN
BY Walter G. Finch
ATTORNEY United States Patent Office 2,998,745
Patented Sept. 5, 1961

2,998,745
OPTICAL-THICKNESS AND REFRACTIVE-
INDEX METER
John F. McClellan, Stansbury Mill Road, Monkton, Md.
Filed Apr. 5, 1956, Ser. No. 576,273
12 Claims. (Cl. 88—14)

This invention relates to measuring instruments of the optical type, and particularly to a measuring device which can be utilized for determining the physical properties of a material, such as the thickness and/or refractive index thereof.

Although this invention is illustrated in conjunction with determining the thicknesses and refractive indices of materials, it is to be understood that the invention is not limited thereto as it can be readily adapted to other applications as will be obvious to those skilled in the art.

In the manufacture of glass, modern plate glass making machinery is capable of working faster and to closer tolerances, than present glass thickness measuring devices or gauges can monitor. For example, in the present continuous process for manufacturing plate glass, sheet glass is passed through successive sets of rollers until, on its arrival at the first abrasive polisher, it is theoretically just a few ten-thousandths of an inch thicker than its final polished thickness should be.

Any overthickness of the glass at this point, therefore, will require excessive polishing to reduce it to the required thickness. On the other hand, glass which arrives at the first abrasive polisher underthick is broken up and sent back for reprocessing. Losses from both underthick or overthick glass are considerable, and are the direct result of slow and insensitive thickness gauging during the rolling process. It is obvious, therefore, that improved thickness gauging will at once allow the glass industry to produce plate glass more economically.

It is one of the objects of this invention to provide a measuring device which will accurately indicate the physical properties of a material, such as thickness and index of refraction, irrespective of the relatively rapid, frequent, large changes in the distance between the device and the material being studied.

Still another object of this invention is to provide a measuring device which is self-contained, compact, and convenient to operate, and one which gives quick and reliable results.

And still another object of this invention is to provide a device for determining the physical properties of a material, such as thickness and index of refraction, which operates by measuring the relative displacements in cycle time of the reflections of a scanning beam or beams of light projected upon opposite surfaces of the sample to the end that direct physical contact between the device and sample is not required.

Still another object of this invention is to provide a measuring device which will operate entirely from one side of the surface of an object, where the other side thereof is inaccessible.

Even still another object of this invention is to provide a measuring device, the electrical output signal of which can be utilized for remote indication and for automatic actuation of machinery to control a process, such as in the setting of the space between rollers which determine the thickness of sheet material in the manufacture thereof.

And even still a further object of this invention is to provide a measuring device which will give no output signal rather than a false signal when the angular setting of the surface of the material being manufactured, with respect to the device, is inadvertently changed.

To provide a measuring device which is capable of detecting lesser differences in physical properties of a material, such as thickness, at a higher repetition rate of measurement than can presently available instruments, during the process of manufacture thereof, is still another object of this invention.

To provide a device, such as a gauge, for measuring a wide range of material thicknesses and refractive indices without the necessity of accommodating adjustment, is still another important advantage and object of this invention.

And another object of this invention is to provide a device which will accurately and instantaneously indicate the physical properties of a material, such as thickness and refractive index irrespective of relatively extreme changes in its scanning rate.

Another object of this invention is to provide a device which will accurately indicate physical properties of a material, such as thickness and refractive index, regardless of relatively large changes of reflectivity of the surfaces of the material being studied.

And still another object of this invention is to provide a measuring device of the optical type which is economical to manufacture, efficient and reliable in operation, and one which is easy to maintain.

These and other objects and advantages of this invention will become more readily understood from the accompanying specification and drawings in which:

FIG. 1 is a side view of the measuring device comprising this invention;

FIG. 2 is a top view of the measuring device illustrated in FIG. 1;

FIG. 3 is an end view of the measuring device illustrated in FIGS. 1 and 2;

FIG. 4 is a diagrammatical representation of a portion of the device illustrated in FIGS. 1, 2, and 3, showing the incident beam in one position;

FIG. 5 is a diagrammatical representation similar to FIG. 4, illustrating a continued translation of the incident beam;

FIG. 6 is a diagrammatical representation similar to FIGS. 4 and 5, illustrating a further continued translation of the incident beam;

FIG. 7 is a representation of one of the output wave forms for the electrical circuit in FIG. 10;

FIG. 8 is a representation of a second output wave form for the electrical circuit in FIG. 10;

FIG. 9 is a representation of a third output wave form for the electrical circuit of FIG. 10;

FIG. 10 is a schematic of the electrical circuit used with the measuring device illustrated in FIGS. 1 to 3;

FIG. 11 is a schematic of a modification of the electrical circuit of FIG. 10;

FIG. 12 is a schematic of a modification of the electrical circuit illustrated in FIG. 10;

FIG. 13 is a diagrammatical representation similar to FIGS. 4 to 6, for measuring the refractive index of a transparent sample;

FIG. 14 is a diagrammatical representation of another embodiment of the measuring device for measuring the thickness of an opaque sample;

FIG. 15 is a diagrammatical representation of still another embodiment of the measuring device for determining the physical properties of a sample;

FIG. 16 is a diagrammatical representation of even still another embodiment of the measuring device for determining the physical properties of a sample;

FIG. 17 is a schematic of even still another embodiment of the measuring device for obtaining various scans for use with said device; and FIG. 18 is a representation of one of the output wave forms for the electrical circuit of FIG. 10, showing means for measuring the wave form.

In accordance with the invention, there is provided a self-contained and conveniently operated instrument for measuring the physical properties of a material, such as thickness and refractive index of glass. In one embodiment of this invention, it includes a source of light, optical means including a rotating mirror to produce a scanning beam of predetermined form from the light source, a photocell responsive to the scanning beam which has been reflected from the glass to be gauged, and an electrical circuit having the photocell connected therein and adapted to display the relative displacements in cycle time of the reflections of the scanning beam from the glass to be gauged as a measure of the thickness of the glass. The signals or pulses obtained from the electrical circuit are displayed visually on an oscilloscope or are recorded on a recording electronic potentiometer and are utilized to determine the thickness of the glass being gauged. In other embodiments of the invention, similar components and arrangements are described wherein the instrument, with minor modification, can be utilized to measure the thickness and the refractive index of a material.

Referring now to FIGS. 1, 2, and 3 of the drawing, there is illustrated a device or gauge 10 for determining or measuring the thickness of a transparent piece of material 12, such as glass or the like. The measuring device 10 includes a base structure 14 upon which the various components are mounted, including a stand or pedestal 16 for supporting a plane mirror 18 at substantially a 45° angle to the horizontal, as best seen in FIG. 1. Stand 16 is secured to the base 14 by means of screws or bolts 20.

A stand or pedestal 22, having a cylindrical housing 24 formed integral therewith at its top, is also mounted on the base 14 by screws 20. This housing 24 is internally threaded at both ends 26 and 28. End 26 of housing 24 has an annular shoulder 30 formed on the interior thereof. A suitable lens 32 is inserted in end 26 of the housing, against shoulder 30. A lock ring 34 is then screwed into the threaded end 26 of housing 24 to position the lens 32. A bushing 36, having an aperture 38, for receiving a suitable source 40 of light, is screwed into the other end 28 of housing 24.

The measuring device 10 also includes a motor 42 which has a 90° prism 44 secured by suitable means to the end of shaft 46 of the motor. The faces 52 and 54 of the prism 44 are optically silvered. The base 48 of the motor 42 is secured to the base 14 by screws or bolts 20. The prism 44 is positioned so that the apex 50 thereof is offset suitably to allow the beam from light source 40 to be reflected from the middle of the face 54 of prism 44. Prism 44 is positioned substantially perpendicular to the base 14, as best seen in FIG. 2. Thus, when the motor 42 is in operation, light from source 40 is reflected by the silvered prism 44 to give periodically and regularly a scanning beam 56 of light. The light source 40 of this beam of light 56 is located at the focus of a parabolic mirror 58 which is mounted in alignment with the beam at one end of the base 14. Mirror 58 is supported in a vertical plane by means of a vertically extending member 60 which has its lower end attached to the base 14. Clip type brackets 62 are used to secure the mirror 58 to the member 60, as best seen in FIGS. 1 and 3.

The beam 56 of light reflected by parabolic mirror 58 is directed to plane mirror 18, where it is reflected upwardly to the transparent piece of material 12, whose thickness is to be measured. The beam 56 of light strikes the first surface 64 of the material 12, and it is reflected as beam 66. The same beam 56 of light is transmitted through the material 12 and is reflected by the second surface 68 of the material as beam 70.

The reflected beam of light from the material 12 is detected by a suitable means, such as a photocell 74, mounted in a housing structure 76. Housing structure 76 is supported by the vertically extending member 60. It has a long section 78 which is in alignment with the beam of light reflected from material 12, with the beam of light being introduced in the housing section 78 through aperture 80 formed in the end thereof. Section 78 of the housing 76, with aperture 80, thus defines the line of sight of the photocell 74. The reflected light beam is directed to the photocell 74. Photocell 74 is inserted in section 82 of the housing through a bushing 84. This bushing 84 is screwed in a threaded aperture 86 in section 82 of the housing.

Photocell 74 is responsive to the scanning beam 56 reflected from the material 12 to be gauged or measured. As shown in FIG. 10, it is connected to an electrical circuit adapted to display the relative displacements in cycle time of the reflections of the scanning beam 56 from the material 12 to be gauged as a measure of the thickness thereof. This electrical circuit will be described subsequently.

Referring now to FIGS. 4, 5, and 6 of the drawings, there are shown consecutively, in diagrammatical form, three important steps in the working half of one complete cycle of the device 10 as it measures the thickness of the glass material 12.

In FIG. 4, the beam 56 of light is incident, at a constant angle, upon the first surface 64, and upon the second surface 68, of the material 12, and it is reflected as beams 66 and 70, as previously mentioned. It is to be noted that during the working part of each cycle, beam 56 continuously translates parallel to itself in the direction of the indicating arrow 72. It is to be further noted that diaphragms 88 and 89 are mechanically equivalent to aperture 80 and the long housing section 78 of housing 74, illustrated in FIGS. 1, 2, and 3.

A continued translation of the incident beam 56, as shown in FIG. 5, has caused the reflected beam 70 from the second surface 68 of the material 12 to pass through the diaphragms 88 and 89 and to impinge on the photocell 74. When this occurs, the photocell 74 generates an electrical pulse or signal, shown by reference numeral 90 in FIG. 7. A further continued translation of the incident beam 56, as shown in FIG. 6, causes the reflected beam 66 from the first surface 64 of the material 12 to pass through diaphragms 88 and 89 and to impinge on the photocell 74. The photocell 74 generates a second electrical pulse, as indicated by reference numeral 92 in FIG. 7. At the end of the cycle, the device 10 resets to the position shown in FIG. 4 without stopping and it immediately begins another cycle of operation. The resultant electrical signals or pulses generated by the photocell 74 for this cycle are shown by reference numerals 96 and 98, in FIG. 7.

Since the program of the scanning light beam 56 is known by construction of the device 10, the ratio $t/(t+t')$, where $t$ is the working portion, or portion between paired reflections of a single sweep of the scanning light beam of the cycle of operation and $t+t'$ is the total cycle time, is proportional to the thickness of the material 12, and its measurement constitutes measurement of the thickness of the material 12. It can be seen, therefore, that the actual rate at which the scanning is performed is immaterial so long as the rate of scan of the beam 56 is substantially constant throughout a given cycle of operation. Thus, the device 10 will accurately indicate the thickness of the material 12 regardless of relatively extreme changes in the scanning rate of beam 56. It is to be noted further that in order to measure the thickness of the material 12, it is not necessary for the device 10 to have direct physical contact with the material; that the thickness measurement of the material 12 can be made entirely from one side thereof when the other side of the material is inaccessible; and that as a result of strict definition of the photocell line-of-sight and the scanning beam path, zero signal results from an angular displacement of the sample material 12 rather than a spurious thickness indication.

It is also to be noted from FIG. 4 that if the sample material 12 is fixed closer to the photocell 74, or farther away, no change in the ratio $t/(t+t')$ will result. Thus for fixed positions of the material 12, the device 10 will accurately indicate the thickness of the material regardless of relatively rapid, frequent, and large changes in the distance between the device and the material 12 being gauged, such as may occur, for example, when plate glass is carried past a thickness gauge on a conveyor belt during its process of manufacture. Furthermore, the design of the electrical circuit for the device 10, shown in FIG. 10, is such that it has a flat frequency response over a wide range, as will be mentioned in more detail, subsequently. This allows the rate of scan of the device 10 to be made so fast in comparison with rates of movement of the material 12 likely to be encountered in practice, as to fix all positions of the sample for practical purposes.

A further examination of FIG. 4 will also show that a material which is much thicker or thinner than that illustrated will cause no distortion of the geometry shown, and so will be gauged without the necessity of refocus or resetting of the device 10. Furthermore, the flat frequency response, over a wide range, of the electrical circuit of the device 10, previously mentioned, prevents the circuit from being a limitation.

The output pulses of signals of the photocell 74, shown in FIG. 7, can be read by measuring $t$ and $t'$ with a scale as they are displayed on the screen of a cathode ray oscilloscope. However, in order to take full advantage of the capabilities of the device 10, a more precise method of display is required, as will now be described. Briefly, $t$, the working portion of the cycle as illustrated in FIG. 7, is converted into "on time" of a constant voltage circuit, by allowing the first pulse 90 of the pair of pulses 90 and 92, to act as "on" switch, and the second pulse 92 of the pair of pulses 90 and 92, to act as "off" switch. The resultant square wave, repeated within proper limits of frequency, is suited for integration and display of $t$ with respect to $t+t'$ by a conventional recording electronic potentiometer 100, illustrated in FIG. 10, and, it is also suited for direct control of electrically actuated machinery. Thus, by suitable arrangement of the device 10, the output signal therefrom can be utilized for an indication at a remote point and for automatic actuation of machinery to control a process of manufacture, such as on the setting of the space between rollers which determine the thickness of sheet glass in the manufacture of plate glass.

Referring now to FIGS. 8 and 9, there are shown square response signals or pulses 102 and 104, and 106 and 108 as might be produced for cycles of the device 10 while measuring thick and thin transparent materials, such as glass, respectively.

The photocell 74, previously described in connection with FIGS. 1 to 6, is connected in the electrical circuit of FIG. 10 by leads 110 and 112 to a source of power, such as battery 114 and to a potentiometer 116. The other sides of battery 114 and potentiometer 116 are connected by leads 118 and 120 to ground 121. During one cycle of operation of the device 10, the first pulse 90 of the pair of pulses 90 and 92, as previously mentioned in conjunction with FIG. 7 is successively amplified by an amplifier 122 consisting of a pentode 124 and a triode 126. The filament 128 of pentode 124 is connected to ground 121 and to the grid 130 of pentode 124 by leads 131 and 132, while grid 134 of pentode 124 is connected by lead 133 through capacitor 135 to potentiometer 116. The remaining grid 136 of pentode 124 is connected by lead 138 to resistor 140 and lead 141 through a capacitor 142 to ground 121. The other side of resistor 140 is connected by lead 137 to the B+ terminal of a suitable source of power (not shown) through a parallel circuit 139 consisting of a resistor 143 and a capacitor 144. The plate 145 of pentode 124 is connected by lead 146 to resistor 147 and capacitor 148, with the other sides of resistor 147 and capacitor 148 being connected by leads 149 and 150 to circuit 139 and a potentiometer 51, respectively. Potentiometer 151, in turn, is connected to ground 121, and is further connected by lead 152 to capacitor 153, with the latter being connected by leads 154 to resistor 155 and the grid 156 of triode 126. Resistor 155 is connected to ground 121 by lead 157.

The filament 158 of triode 126 is connected through a parallel circuit 159 consisting of resistor 160 and a capacitor 161 to ground 121, while the plate 162 thereof is connected by leads 164 and 165 to resistor 166 and the filament 167 of a dual diode 168. Resistor 166, in turn, is connected by lead 169 to the B+ terminal of the suitable power source (not shown).

The dual diode 168 receives the amplified pulse from the triode 126, and it simultaneously rectifies the pulse and splits it into two equal pulses. These two equal pulses are passed simultaneously and separately to the grids 171 and 172 of the dual-triodes 173 and 174, respectively, which are connected to the plates 175 and 176 of dual diode 168 by leads 177 and 178. The plates 179 and 180 are connected by leads 181 and 182 to resistors 183 and 184, respectively, which, in turn, are connected by leads 185 and 186 to the B+ terminal of a source of power (not shown).

Plate 179 of dual-triode 173 is connected by leads 187 and 188 to a resistor 189 and a capacitor 190, with the other sides of the resistor 189 and capacitor 190 being connected by leads 191 and 192 to the grid 172 of the dual-triode 174. Similarly, plate 180 of dual-triode 174 is connected by leads 193 and 194 to a resistor 195 and a capacitor 196, with the other sides of the resistor 195 and capacitor 196 being connected by leads 197 and 196 to the grid 171 of dual-triode 173.

The filament 201 of dual-triodes 173 is connected to a circuit 202 consisting of a resistor 203 and a capacitor 204, with circuit 202, in turn, being connected by lead 216 to a second circuit 217 consisting of a resistor 205 and a capacitor 206. This circuit 217, in turn, is connected to ground 121. The filament 208 of dual triode 174 is likewise connected to a circuit 209 consisting of a resistor 210 and a capacitor 211, with said circuit 209 being connected by lead 213 to the recording electronic potentiometer 100 through a resistor 212. Circuit 217 is connected by lead 215 to the potentiometer 100. Capacitors 218 and 219 are connected between the plates 175 and 176 and grids 171 and 172 of the dual-diode 168 and the dual-triodes 173 and 174, respectively. Resistors 220 and 221 are connected between ground 121 and the grids 171 and 172 of the dual-triodes 173 and 174, respectively. The recorder 100 is connected by lead 224 to ground 121. An oscilloscope 300 is connected in parallel with the recorder 100 by lead 302.

The circuit described is one embodiment of the well-known Eccles-Jordan or "flip-flop" circuit. It is characterized by having two stable states, as either half of the circuit conducts, to the exclusion of the other. Upon application of a suitable trigger pulse to the grid of the non-conducting triode of the said dual-triode circuit, or, as in this instance, to both grids 171 and 172 simultaneously, as described, the non-conducting half of the dual triode circuit almost instantaneously becomes the conducting half, as is well known in the art. When this occurs in the circuit shown in FIG. 10, the voltage drop across the cathode resistor 212 is sensed as a constant voltage signal by the recording electronic potentiometer 100.

Arrival, by the same path, of the second signal 92 in FIG. 7 of the pair of signals 90 and 92, reverses the dual triode and, removes the voltage drop across the resistor 212, ending the constant voltage signal to the potentiometer 100, and thus ends the cycle of operation.

It is well known that a suitably designed Eccles-Jordan circuit, as illustrated in FIG. 10, will respond equally to triggering pulses of widely differing voltage. This means that the reflected beams 66 and 70 in FIG. 1 can be of widely different intensity, corresponding to different surface reflectivities of the sample, without affecting the operation of the device 10. Thus, device 10 will accurately indicate the thickness of material 12 irrespective of relatively large changes of reflectivity of the surfaces 64 and 68 of the material being gauged.

It was previously stated that the geometrical design of the device 10 renders it free from errors arising from changes in its scanning frequency, within wide limits. This is true for the electrical design of the device 10 also, since it is well known that suitably designed Eccles-Jordan circuits, such as that shown in FIG. 10, operate satisfactorily throughout the medium and high audio frequency and low radio frequency ranges, with the result that device 10 will accurately indicate the thickness of the material 12 regardless of relatively extreme changes in its scanning rate. For example, in the embodiment of the invention described, the device or gauge 10 detects thickness differences of .0005" in one inch plate glass, at a scanning rate of 4000/minute with unimpaired sensitivity and accuracy when the scan rate is reduced to 1000/minute. The device or gauge 10, therefore, is capable of detecting lesser differences in thickness of the material 12 at a higher repetition rate of measurement than presently available instruments utilized for measuring plate glass during the process of its manufacture.

The device 10 can also be utilized to measure a second physical property, namely, the refractive index of transparent sheet material 12, in addition to its thickness. The reading given by the gauge or device 10 at any given time is a combination of both the thickness and the refractive index of the material being measured. In the use of the single unit device 10, either the thickness or the refractive index must be held constant so that the alternative quantity is represented by the indication of the device.

For example, referring now again to FIG. 4, it will be seen that if the thickness of the transparent material 12 is held constant, and if the refractive index of the material 12 is changed, the spacing between beams 66 and 70 will change proportionately, thus altering the ratio $t/(t+t')$ proportionately.

As a practical illustration of how the device 10 can be utilized to measure refractive index of a material, let it be assumed in FIG. 13 that the device is identical with that of FIG. 4, but that the material is not plate glass 12, being instead a thin walled glass pipe 230 of constant rectangular cross-section, filled with a clear solution 232 whose refractive index is being monitored. It is obvious that the reflected beams 66 and 70 will be substantially those of FIG. 4, and equally acceptable for obtaining dependable accurate indication from the device 10, in this instance, indication of refractive index rather than of thickness of the material 12.

In addition to the above, the device or gauge 10 can, without substantial change, be used to measure the thickness of opaque sheet material, provided that the opaque sheet material be positioned at a constant distance from the gauging head.

In FIG. 14, an opaque material sample 234 is positioned at a known distance from the photocell 74, as for instance on a reflective table surface 236. In this case, operation of the device 10 is as described previously, except that only the reflected beam 66 of the first surface 64 is used to actuate the photocell 74 and to produce the second pulse 92 in FIG. 7. The initial pulse 90 of FIG. 7, is produced by the same reflected beam 66 when beam 66 has reached a designated point in its cycle of operation and has been suitably reflected into the photocell 74 from a reference surface, as, for example, from the reflective table surface 236, by way of a mirror 238, and a half silvered mirror 240, as shown by the path 242 of the reflected beam 66.

It is to be noted that in this embodiment of the invention, there is no compensation for "rise and fall" of the material 234. The material 234 must remain at a constant distance from the light source 40 and photocell 74 during successive scans.

A further examination of the arrangement illustrated in FIG. 14 will show that the device 10 will operate regardless of whether the material 234 is opaque or transparent, since only the reflected beam 66 from the first surface 64 is used. In this arrangement, since the device 10 is capable of measuring the thickness of a transparent material 234 without transmission of the scanning beam 56 through any part of the material, it, therefore, measures the thickness of the transparent sample without reference to the refractive index thereof.

In this arrangement of the invention, the sample material 234 must be positioned at a constant distance from the light source 40 and photocell 74 during successive scans of the scanning beam 56. It is to be further noted that extreme care must be taken in adjusting the device 10 to neglect the reflected beam 70 from the second surface 68 of the material 234.

Two reflection type devices 10 similar to the device previously described, when suitably installed one on either side of an opaque reflective sheet material 246 at a constant distance from each other, as shown in FIG. 15 can be used to measure the thickness of the material continually and without any error caused by translation of the material toward or away from either of the devices 10. The two devices 10, represented by the reflected beams 66 and photocells 74 and 75, are fixed with respect to each other and are located on opposite sides of the sample of reflective opaque sheet material 246. The devices 10 face in opposite directions, but their scans are in the same direction and are suitably synchronized and offset in phase. The top photocell 74 is connected electrically to the circuit described in FIG. 10 in such a manner that it produces one pulse 90 of the two pulses 90 and 92, in FIG. 7, while the bottom photocell 75 in the same manner, produces the second pulse 92 of the pair of pulses 90 and 92 in FIG. 7 with the result that the characteristic square-wave pattern 102 is produced as described in connection with, and shown in, FIG. 8.

The time between actuation of the photocells 74 and 75 will depend solely on the thickness of the material 246 and will be unaffected by relatively long term changes in the position of the material since any increase in the distance between the material and one photocell 74 or 75 will be compensated for by a decrease in the distance between the material 246 and the other photocell 75 or 74.

The amplifier 122 of electrical circuit of FIG. 10, with photocell 74 as shown in FIG. 11, is duplicated for the second photocell 75 of FIG. 15 up to the dual-diode 168. In this case, the dual-diode 168 can be eliminated and the output leads from the amplifiers 122 would be connected separately to the input leads of the dual-triodes 173 and 174. In this arrangement, the photocell 74 would always produce the initial pulse 90 of FIG. 7 and photocell 75, in the same manner, would produce the second pulse 92 of FIG. 7.

The electrical circuit of FIG. 10 can be modified as shown in FIG. 12 to include the two photocells 74 and 75 in parallel, and by the addition of a switch 252, actuated in synchronism with the scan. In this instance, only one amplifier 122 would be required with the electrical circuit, which would be identical to that of FIG. 10, except for the addition of photocell 75 and switch 252.

Examination of the arrangement shown in FIG. 15 will show that it will operate regardless whether the material 246 is opaque or transparent since only the reflected beam 66 from the first surface is used.

Thus, in this embodiment of the invention, the device 10 is capable of continuously measuring the thickness of a transparent material 246 or opaque material, without any error being caused by relatively long term translation of the material toward or away from either half of the device as previously described in connection with FIG. 15, and in addition, since neither light beam 56 need pass through any part of the material 246, the device 10 measures the thickness of the material 246 without reference to the refractive index of the material.

Simultaneous determination of the thickness and refractive index of sample 246 may be had by using the identical arrangement described in connection with FIG. 15 and the same electrical circuits shown in FIGS. 10 and 11. The paired devices 10 function in synchronism as previously described to determine sample thickness without reference to index of refraction, and the result is displayed as described, as the output of the recording potentiometer 100.

The top device 10 also functions independently, in the exact manner described in connection with FIGS. 4, 5, and 6, to determine the amount of offset of the second reflected beam 66 occasioned by the combination of thickness and refractive index of the sample 246. This dual function on the part of the top device 10 is effected by a slight readjustment of the scan of the top device 10, which causes both the first and second reflected beams 66 and 70 to fall cyclically on its photocell 74, and to do so prior, in the cycle, to the impingement of the first reflected beam 66 on the photocell 75 of the bottom device 10.

The resultant two pulses per cycle emitted by the photocell 74, of the top device 10, plus the one pulse per cycle emitted by the photocell 75, of the bottom device 10, are so spaced in cycle time as to be capable of indication of the refractive index of the sample 246 as a function of sample thickness. The three pulses may be displayed for measurement on the screen of any ordinary test-type cathode ray oscilloscope 300 by connecting the oscilloscope input to lead 215, as shown in FIG. 10, so that it is paralleled with the recording potentiometer 100. As connected, the second surface originated pulse from photocell 74 appears simply as a pulse 304, as shown in FIG. 18, superimposed upon the characteristic square-wave pattern 102, which was previously described in connection with FIG. 15.

As is well known in the art, the horizontal gain and centering controls of the oscilloscope 300 can be used to register the start 306 and stop 308 of the square-wave 102, as shown in FIG. 18, with two arbitrary fiducial marks, in this case, the ends of an empirically calibrated scale 310, suitably disposed on the screen 312 of the oscilloscope 300. The refractive index of the sample 246 is now directly indicated by the position of the pulse 304 on the scale 310.

Since actual sample thickness is known at any instant from the output of the recording potentiometer 100, both quantities—refractive index and thickness of the sample—are thus made simultaneously available.

The same general principle described in connection with FIGS. 1 to 13 of scanning reflected beams 66 and 70 past the photocell 74 in order to discover displacements in their positions indicative of sample thickness (or refractive index) can be used in the device 10 to advantage with transmitted beams. This requires a re-arrangement in the geometry of the device 10, and the inclusion in the electrical system of a reference pulse, suitably produced once each cycle, as, for example, the initial pulse is produced for the arrangement of the device of FIG. 14.

In this re-arrangement, shown in FIG. 16, the translating beam 56 cyclically impinges directly on the photocell 74 in the absence of the material 250. The reference pulse is always produced at this exact time in the cycle, that is, at the time beam 56 enters the photocell 74 when the material is not in the path of the beam.

When the material 250 is interposed at a suitable constant angle of the beam 56, the beam 56 is offset parallel to itself as a result of its passage through material and the offset beam 254 arrives at the photocell 74 at a different time in the cycle in consequence of its being offset.

Since the amount of offset of the beam 254, as indicated by the difference in time between the (automatically produced) initial pulse 90 and the second pulse 92 of FIG. 7 (produced by actuation of the photocell 74 by the beam 254) is constant for a given sample of constant thickness and refractive index, the material 250 can instantaneously translate parallel to itself toward or away from the photocell 74 without changing the position of the transmitted beam 254. Thus, no error is introduced in the gauge indication by device 10 by such motion of the material.

This transmission-type device 10 will indicate either thickness or refractive index of the material 254 depending on which of the two is the known constant, as explained for the reflection-type gauges in variations of the invention described in connection with FIGS. 13, 14, and 15.

One advantage of this transmission-type device 10 over the reflection-type device 10 described in connection with the other embodiments of the invention is that a given angular change of the material will produce less error in the indication of this type device than a corresponding angular change of the material will produce in the indication of the reflection-type device 10.

Perhaps the principal advantage of this transmission-type device of FIG. 16 over the reflection-type device of FIGS. 1 to 15 is the fact previously mentioned that instantaneous translatory motion of the material sample during the period of a scan or between scans introduces no error in the indication, by the device, whereas, with the reflection-type device, such motion of the material during the period of a scan must be relatively slow with respect to the time required for the scan.

It is to be noted that with the embodiment of the invention of FIG. 16, no additional apparatus is required, other than suitable means for placing the scanning light source 40 on opposite side of material 250 whose thickness or refractive index is to be measured or determined.

In FIGS. 1, 2, and 3, there was illustrated one arrangement for scanning the indicating beam of light 66 past the photocell 74. However, any one of the three, that is, the light source 40, material 12, or photocell 74, can be moved with respect to the other two to achieve the required scan.

A preferred ararngement for scanning the beam 56 in the reflection-type device is to fix the beam 56 and light source 40 and the photocell 74 with respect to each other and to oscillate the beam 56 and light source 40 and photocell 74 toward and away from the material 12 as shown in FIG. 17. It is obvious that the same effect can be had by oscillating the material 12 toward and away from the beam 56 and light source 40 and photocell 74.

In the arrangement of FIG. 17, the light source 40 and the photocell 74 are rigidly mounted on the same base 260. Base 260, in turn, is secured to two vertically extending rod members 262 and 264 which are screwed into the base. The members 262 and 264 pass through a horizontal extending guide member 266, which has one of its ends 268 secured to a stationary base 270. A plate 274 is mounted on the upper ends of members 262 and 264. A coiled spring 272 is positioned between the plate 274 and the horizontal guide member 266. A vertically extending rod member 276 is secured at its lower end to the plate 274, and at its upper end it engages a suitable cam 280 which, in turn, is secured to a shaft 282 from a motor, such as motor 42, illustrated in FIGS. 1, 2, and 3.

Upon movement of the cam 280, the member 278 is moved upwardly and downwardly to cause the light source 40 and photocell 74 to be moved toward and then away from the sample material 12 whose physical properties are to be determined, as previously described.

There are several advantages of this type of scan over the type of scan described in connection with the previous embodiments of the invention.

The spot on the first surface 64 of the material 12 which reflects the beam 66 to the photocell 74 lies on a perpendicular through the material with the spot on the second surface 68 of the material which reflects the beam 70 to the photocell 74, that is, the gauging spots on the two surfaces 64 and 68 lie directly over each other as they would be if the glass 12 were measured with calipers. This is especially useful in measuring the thickness of curved glass.

This arrangement of FIG. 17 is nearly fixed focus in that the path-length of the beam 56 when reflected from the first surface 64 to the photocell 74 is practically the same as path-length of the beam 56 when reflected from the second surface 68 to the photocell 74. This permits the use of a suitably fixed-focus scanning beam of light, which, in turn, permits observation of a smaller area of the surface of the material 12.

It is to be noted, that under conditions in which it is possible to have a well defined reflected beam (such as 66 in FIG. 17) and a small detector (such as photocell 74, FIG. 17), diaphragms (such as 88 and 89, FIG. 4) may be dispensed with, as in the arrangement shown in FIG. 17.

In another practical arrangement for scanning (not shown), the photocell 74, the material 12, and the light source 40 of the beam 56 are fixed with respect to each other and a constantly rotating sector (not shown) arranged in the paths of beams 66 and 70, allows first one reflected beam 66, and then the other reflected beam 70, to impinge on the photocell 74 after reflection from a collecting mirror (not shown), which is positioned in line with the sector and the photocell (the latter being positioned 180° from its normal direction shown in the earlier described embodiments of the invention). In all other respects, this arrangement operates in the same manner as that described in connection with FIGS. 1 to 10.

Obviously many other modifications and variations of the present invention are possible in light of the above teachings. It is, therefore, to be understood that within the scope of the appended claims the invention may be practiced otherwise than as specifically described.

What is claimed is:

1. A device for determining a physical property of a body having spaced surfaces, comprising, means for producing a parallel beam of radiation, cyclical means for producing a parallel sweeping scan of said beam of radiation at an oblique angle onto said spaced surfaces of said body for displacement therefrom, and an electrical circuit including means responsive to the radiation of said scanning beam from said body and adapted to determine the displacements of said scanning beam from said spaced surfaces, within a given cycle, as a function of the physical property being determined for said body.

2. A device for determining the refractive index of a transparent body having spaced optical surfaces, comprising, scanning means including a source of radiation for producing repetitively and regularly a parallel sweeping beam of collimated radiation between said spaced optical surfaces of said body for displacement therefrom, said sweeping beam of collimated radiation being arranged to fall on one of said surfaces at an incident angle other than perpendicular, an electric circuit including means responsive to said displaced radiation from one of said spaced optical surfaces of said body and adapted to determine, within a single sweep of said scanning means, the position of said displaced radiation from said one of said spaced optical surfaces of said body, relative to the position of the undisplaced radiation from the other of said spaced optical surfaces of said body, as a function of the refractive index of said body.

3. A device for determining the refractive index of sheet material, comprising, means including a source of radiation for producing a substantially collimated cyclically scanning beam of radiation from said source of radiation for projection at an oblique angle through said sheet of material, for displacement thereby at a time in the cycle of said scanning beam of radiation, and an electrical circuit including means responsive to the displaced radiation from said sheet of material and adapted to determine the time of displacement of said radiation in said cycle, said responsive means being positioned on the opposite side of said sheet of material from said means for producing a scanning beam of radiation.

4. An instrument for measuring the distance between substantially parallel spaced optical surfaces of a transparent body having freedom to move in translation, comprising, a source of radiation for producing a beam of parallel radiation from said source of radiation for transmission through said body at an oblique angle, an electric circuit including a detector responsive to said beam of parallel radiation from said body, motor means for producing a cyclical parallel sweeping relative scan between said beam of parallel radiation and said detector, and means for producing a reference electric signal at a time in each cyclical parallel sweeping relative scan, for comparison with the cyclical time of arrival on said detector of said beam of parallel radiation from said body as a function of the distance to be measured, whereby the spacing between said optical surfaces is determined irrespective of any translation of said body.

5. A device for determining the refractive index of transparent material having spaced optical surfaces, comprising, means for producing a parallel beam of radiation, cyclical means for producing a parallel scan of said beam of parallel radiation onto said spaced optical surfaces of said transparent material for reflective displacement therefrom, and an electric circuit including means responsive to the beams reflectively displaced from said spaced optical surfaces of said transparent material and adapted to determine cyclically the relative displacements of said beams reflectively displaced from said transparent material as a measure of the refractive index of said transparent material.

6. A device for determining a physical property of a transparent body having spaced surfaces, comprising, means including a source of radiation for producing a parallel scanning beam of radiation at an oblique angle onto said spaced surfaces for displacement by regular reflection therefrom, an electric circuit including means responsive to the radiation regularly reflected from said spaced surfaces of said transparent body and adapted to measure the relative displacements of the regularly reflected beams from said spaced surfaces of said transparent body within each scan of said scanning beam of radiation, and optical element means positioned in advance of said responsive means to pass selectively said regularly reflected radiation from said spaced surfaces of said transparent body.

7. In a device for continually determining the thickness of transparent material having spaced parallel optical surfaces without reference to the distance separating said device and material, means including a source of radiation for producing a slender parallel beam of radiation on said spaced optical surfaces of said material at an oblique angle for displacement therefrom, electric circuit means responsive to the radiation displaced respectively from said spaced optical surfaces of said material, and means including an optical element for producing a parallel sweeping scan of the displaced radiation from said respective spaced surfaces of said material successively onto said responsive means for measurement of the relative displacement of the radiation from the respective spaced optical surfaces of said material as a function of the thickness of said material.

8. An instrument for measuring the distance between spaced optical surfaces of a transparent body, comprising, a source of radiation, means for projecting a beam of radiation from said source of radiation against said spaced optical surfaces of said body at an inclination adapted to produce, simultaneously, spaced regular reflections of said beam of radiation from said spaced optical surfaces, an electric circuit including means responsive to said spaced regular reflections of said beam of radiation from said spaced optical surfaces, selective means having an optical aperture defining an entrance path for said regular reflections of said beam of radiation from said spaced optical surfaces to fall on said responsive means, and cyclical parallel scanning means arranged to cause said regular reflections of said beam of radiation to fall on said responsive means.

9. A device for measuring the thickness of transparent material having spaced optical surfaces, comprising, means including a source for producing a slender beam of radiation on said spaced optical surfaces of said material, circuit means including a detector sensitive to the radiation displaced by said spaced optical surfaces, said source means being inclinedly fixed with respect to said detector means, and motor means for producing cyclic parallel relative movement between said fixed elements and said material to the end that said beam of radiation is reflected sequentially from said spaced surfaces to impinge on said detector.

10. In an instrument for measuring simultaneously the refractive index and the thickness of a transparent body having spaced optical surfaces, a pair of substantially identical measuring devices, each said measuring device having a source of radiation, optical means for projecting a beam of radiation from said source of radiation against said spaced optical surfaces at an inclination adapted to produce spaced reflections of said beam of radiation from said spaced optical surfaces, one of said reflections of said beam of radiation being transmitted through said body for reflection from one of said spaced optical surfaces and a second one of said reflections of said beam being reflected directly from the other of said spaced optical surfaces, an electric circuit including means responsive to said reflections of said beam of radiation, one of said measuring devices being fixedly opposed to the other of said measuring devices, with said transparent body being located therebetween, and synchronizing electric means adapted to compare the responses of the respective responsive means of the said devices.

11. Apparatus for detecting changes in the properties of a fluid, comprising, spaced parallel optical walls to form spaced parallel optical boundaries with said fluid, a source of radiation, optical scanning means for projecting a beam of radiation from said source of radiation on said fluid for producing spaced reflections of said beam of radiation from said optical boundaries, and an electric circuit including means responsive to the said reflections of said beam of radiation from said optical boundaries and adapted to determine and display said spacing between said reflections from said optical boundaries as a function of the changes in properties of said fluid.

12. A device for determining a physical property of a body having spaced optical surfaces, comprising, means including a source of radiation for producing a cyclically timed parallel sweeping beam of radiation from said source on said body for reflective displacement from said spaced optical surfaces thereof, electric circuit means responsive to the radiation of the reflected beams from said spaced optical surfaces of said body and adapted to determine the relative displacements in cycle time of said reflected beams from said spaced optical surfaces of said body as a resultant of said physical property of said body, and diaphragm means to allow said reflected beams of radiation to selectively impinge on said responsive means sequentially in said cycle.

References Cited in the file of this patent

UNITED STATES PATENTS

| | | |
|---|---|---|
| 1,503,543 | Lytle | Aug. 5, 1924 |
| 1,939,088 | Styer | Dec. 12, 1933 |
| 2,216,716 | Withem | Oct. 1, 1940 |
| 2,365,580 | Murcek | Dec. 19, 1944 |
| 2,379,263 | Vine | June 26, 1945 |
| 2,429,066 | Kuehni | Oct. 14, 1947 |
| 2,645,971 | Herbst | July 21, 1953 |
| 2,719,235 | Emerson | Sept. 27, 1955 |

FOREIGN PATENTS

| | | |
|---|---|---|
| 684,435 | Great Britain | Dec. 17, 1952 |